United States Patent
Poola et al.

(10) Patent No.: US 9,317,393 B2
(45) Date of Patent: Apr. 19, 2016

(54) MEMORY LEAK DETECTION USING TRANSIENT WORKLOAD DETECTION AND CLUSTERING

(71) Applicant: Oracle International Corporation, Redwood City, CA (US)

(72) Inventors: Thyagaraju Poola, Sunnyvale, CA (US); Vladimir Volchegursky, Redwood City, CA (US); Ashok Srinivasa Murthy, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 197 days.

(21) Appl. No.: 13/917,594

(22) Filed: Jun. 13, 2013

(65) Prior Publication Data

US 2014/0372807 A1 Dec. 18, 2014

(51) Int. Cl.
G06F 11/00 (2006.01)
G06F 11/34 (2006.01)
G06F 11/30 (2006.01)

(52) U.S. Cl.
CPC ........ *G06F 11/3452* (2013.01); *G06F 11/3037* (2013.01); *G06F 11/3409* (2013.01); *G06F 11/3414* (2013.01); *G06F 11/3466* (2013.01)

(58) Field of Classification Search
CPC ............ G06F 11/3452; G06F 11/3414; G06F 11/3466; G06F 11/3636
USPC .................................................. 714/47.3, 39
See application file for complete search history.

(56) References Cited

U.S. PATENT DOCUMENTS

| 6,792,393 | B1 * | 9/2004 | Farel et al. ..................... 702/186 |
| 7,434,105 | B1 * | 10/2008 | Rodriguez-Rivera et al. ............................ 714/38.1 |
| 7,500,079 | B2 | 3/2009 | Becker |
| 7,716,648 | B2 | 5/2010 | Vaidyanathan et al. |
| 7,757,202 | B2 | 7/2010 | Dahlstedt et al. |
| 8,397,048 | B2 | 3/2013 | Zachmann |
| 8,397,111 | B2 | 3/2013 | Hogstrom et al. |
| 8,423,718 | B2 | 4/2013 | Tsai et al. |
| 2005/0076184 | A1 * | 4/2005 | Schumacher ................. 711/170 |

(Continued)

FOREIGN PATENT DOCUMENTS

WO 2012127482 9/2012

OTHER PUBLICATIONS

Peng Sun and Robert M. Freund "Computation of Minimum Volume Covering Ellipsoids" Jul. 30, 2002,MIT Operations Research Center, Cambridge, MA, pp. 1-36.

(Continued)

*Primary Examiner* — Yair Leibovich
(74) *Attorney, Agent, or Firm* — Robert C. Kowert; Meyertons, Hood, Kivlin, Kowert & Goetzel, P.C.

(57) ABSTRACT

Methods and apparatus for memory leak detection using clustering and trend detection are disclosed. Performance metrics are collected from an executing process. A first statistical analysis of at least one metric is used to identify trending and non-trending workload periods for the process. A second statistical analysis on the metrics for the non-trending workload periods is used to determine clusters of metrics corresponding to stable workload levels. A third statistical analysis is performed on each of the clusters to determine whether an upward trend in memory usage occurred. If an upward trend in memory usage is detected, a notification of a potential memory leak is generated.

19 Claims, 8 Drawing Sheets

(56) References Cited

U.S. PATENT DOCUMENTS

| | | |
|---|---|---|
| 2012/0216076 A1 | 8/2012 | Macik et al. |
| 2013/0054923 A1 | 2/2013 | Bradley et al. |
| 2013/0055034 A1 | 2/2013 | Qiu et al. |
| 2013/0211762 A1* | 8/2013 | Taskov .......................... 702/88 |
| 2014/0215176 A1* | 7/2014 | Iga .............................. 711/170 |

OTHER PUBLICATIONS

Katharine Lynn Gray "Comparison of Trend Detection Methods" Spring 2007, The University of Montana, Missoula, MT, pp. 1-97.

* cited by examiner

MEMORY LEAK DETECTION USING TRANSIENT WORKLOAD DETECTION AND CLUSTERING

BACKGROUND

Computing applications run using industry-standard, platform-independent technologies such as the Java™ execution environment are often mission-critical for the success of many types of organizations and businesses. As such, ensuring that the applications remain up and running, and in a healthy-enough state to provide desired levels of responsiveness to application workload requests for long periods of time, is a very important responsibility of the organization's IT staff.

Memory management problems can impact an application's responsiveness and longevity. For example, consider a scenario in which a certain amount of memory is allocated or referenced in response to a particular application work request (such as a request for a dynamic web page whose content is generated by an application server), but not all that memory is released or freed after the work corresponding to that request is completed. If this sequence of events is repeated for large numbers of work requests, even if the amount of memory that is not released per request is very small, over time, the server being used for the application may run low on memory (which may lead to slower response times) or even run out of memory entirely (which may result in an application outage). Such problems are referred to as memory leaks. Memory leaks, which can often be the result of subtle programming bugs, especially in high-concurrency applications, are often exhibited even in environments in which automatic garbage collection (GC) is implemented.

Memory leaks are notoriously hard to detect, especially if they are gradual rather than fast. In some cases, enabling instrumentation for memory usage analysis can result in substantial overhead, and hence such an approach may not be practical in production environments. Furthermore, even with such potentially onerous instrumentation enabled, in many cases, it is still hard to identify slow memory leaks, since some of the memory usage changes over time may be the consequence of changes in application workload.

SUMMARY

Various embodiments of apparatus and methods for memory leak detection using transient workload detection and clustering are described. According to one embodiment, a number of performance metrics may be collected from an executing application process (such as a Java™ Virtual Machine or JVM). Over various observation periods, respective time series of various metrics may be collected, such as CPU usage metrics, free heap memory metrics, and/or the number of active application threads. Each time series may be logically modeled or represented as a sequence or collection of tuples of the form (metric-type, time, metric-value) in some implementations. Some of the metrics may serve as indicators of the workload level of the application. For example, as the rate of arrival of work requests at an application server process increases, new application threads may be instantiated and activated. Thus the variation of the number of active application threads over time may correlate strongly with the variation in the application workload, at least for some types of applications. Accordingly, in at least some embodiments, a statistical analysis of some of the metrics collected over an observation period may be performed to determine a first set of one or more sub-periods of the observation period during which the workload of the executing process exhibited a statistical change trend (e.g., an upwards trend or a downwards trend). Such sub-periods, during which the application workload either increased or decreased in a statistically significant manner, may be termed "trending-workload" sub-periods or "transient-workload" sub-periods herein. Using this first type of statistical analysis, which may be termed a "trend analysis" herein, the remaining sub-periods, during which the workload did not exhibit trending, may also be identified. This second category of sub-periods may be termed "stable-workload" periods. The first step of metrics classification using statistical analysis may involve the use of any of various statistical algorithms on the workload-indicating metrics, such as, for example, sliding-window linear regression techniques.

Thus, using a first statistical technique on metrics that are indicative of workload levels, the observation period's metrics may be classified into sets corresponding to "trending-workload" sub-periods and "stable-workload" sub-periods in some embodiments. A second statistical technique, such as k-means clustering analysis or any other appropriate statistical grouping algorithm, may then be utilized to identify one or more metric clusters among the metrics corresponding to the stable-workload sub-periods. Each metric cluster or group may correspond to a respective statistically stable workload level—that is, each cluster may represent a corresponding mean workload level, with some variation around the mean. For example, from one set of stable-workload sub-periods, three clusters C1, C2 and C3 may be identified: cluster C1 with a mean workload level of 5 requests per second, cluster C2 with a mean workload level of 20 requests per second, and cluster C3 with a mean workload level of 50 requests per second. It is noted that in this example, the times (relative to the startup time of the process) at which the workload was close to 5 requests per second may differ—that is, not all the data points of the first cluster C1 may be close to each other in their time values. For example, if the observation period was one hour, one stable workload period SWP1 with a mean of 5 requests per second may have occurred at around 20 minutes into the hour, another stable workload period SWP2 with a mean of 5 requests per second may have occurred at around 33 minutes, and so on; and other metrics (e.g., memory usage metrics) for each of these periods during which the workload mean was 5 requests per second may be collected into cluster C1.

For each cluster representing a respective workload level, a third step of statistical analysis may then be performed in at least some embodiments, to actually determine whether there was any statistically significant increase in memory usage for the corresponding workload level (and thus detect possible memory leaks). Thus, while the first two steps of analysis described above—the trend analysis and the clustering—may focused on using workload metrics to ensure that metrics corresponding to stable workloads are identified, the third step may involve examining the changes in memory usage (if any) for each stable level of workload. For example, continuing the above example, if an analysis of free memory metrics collected corresponding to cluster C1 (i.e., free memory metrics collected at close to the same times as the workload-indicating metrics representing the mean of 5 requests/second) indicates that the amount of free memory did not decrease in a statistically significant way, the conclusion that no memory leak was detected for a workload level of approximately 5 requests per second may be drawn with a high degree of confidence. This third step of statistical analysis may involve linear regression (e.g., stepwise linear regression with a sliding time window) in at least some embodiments. Similar analyses may be carried out on the memory metrics corresponding to each of the other clusters, such as C2 and C3 in the above example. At least in some cases, the memory metrics analysis for one or more of the clusters may indicate a statistically significant increase in memory usage (i.e., a decrease in free memory). A statistical confidence level in the increase, e.g., a measure of confidence that the memory usage did not increase simply as a result of random fluctuation, may be determined. If the confidence level is high, the increase in memory usage may represent a potential memory leak. A notification of the potential memory leak (together with the corresponding confidence interval or confidence level associated with the increase in memory usage) may be provided, for example, to an application administrator in at least some embodiments. The notification may trigger a separate memory leak diagnosis/debugging effort. The statistically rigorous approach outlined above may be useful in proactively convincing support staff and/or engineering staff that a memory leak problem has very likely been found, which may help channel the appropriate resources to debugging and resolving the problem.

In one embodiment, the performance metrics may be collected by one or more efficient monitoring threads that run as part of the application process. Such threads may impose very little overhead on the running application, and thus may be deployed as part of a production environment in at least some embodiments. Of course, similar lightweight monitoring may also be used in development and test environments as well. The statistical analysis itself may be performed at a separate process in at least some embodiments, which may be able to read the metrics generated by the monitoring thread in an asynchronous manner. The low-impact monitoring may be enabled by default in at least some embodiments, so that no additional command-line flags or special configuration is required for the memory leak detection.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
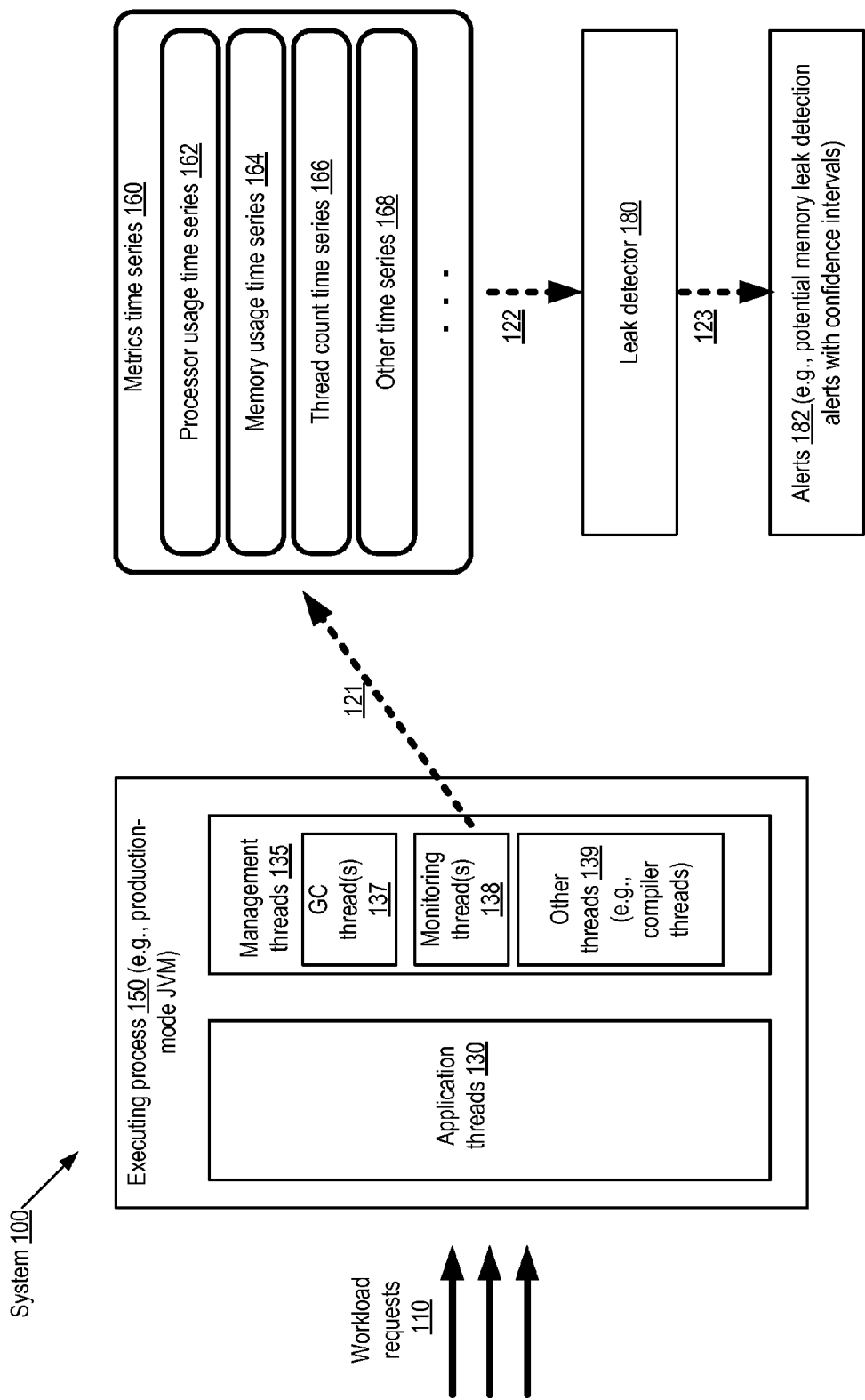
FIG. 1 illustrates an example system environment, according to at least some embodiments.

Various embodiments of methods and apparatus for memory leak detection using transient workload detection and clustering are described. FIG. 1 illustrates an example system environment, according to at least some embodiments. As shown, system 100 of FIG. 1 comprises an executing process 150 to which various workload requests 110 may be directed over time. The executing process 150 may be implemented using any appropriate hardware and/or software stack, such as various versions of the Java™ programming environment running on a physical or virtualized host, or processes executing code written in languages other than Java. A Java™ process may be referred to as a Java™ Virtual Machine or JVM. It is noted that although a platform-independent language and execution environment is used as an example herein, the techniques for memory leak detection described may be employed in various embodiments in any execution environment for programs written in any language, include various platform-specific languages and environments.

The executing process 150 may comprise a plurality of threads of execution, which may broadly be categorized into at least two groups: application threads 130, and management threads 135. Application threads 130 may be instantiated or spawned in response to the workload requests 110. For example, if the executing process 150 represents a Java™ 2 Enterprise Edition (J2EE) application server handling requests for dynamic content received from a web server, if no idle application thread is available to handle a received request, a new application thread 130 may be started up. Application threads may be organized into a pool with tunable settings such as the minimum and maximum number of threads in some implementations, so that threads can be reused for different workload requests to the extent possible, and the overhead of instantiating and terminating threads may thereby be reduced. Thus, at a given point in time in the depicted embodiment, some subset of the application threads 130 may be actively performing work on behalf of incoming requests 110, while others may be idle and waiting for further requests. The number of active application threads 130 at a given point in time may be correlated fairly strongly with the number of workload requests 110 being handled concurrently for at least some applications, and thus the metric of "number of active application threads" may serve as a reasonable proxy or representative of workload levels.

The management threads 135 in the embodiment shown in FIG. 1 may be responsible for various administrative and process management tasks. For example, as shown, one or more garbage collection (GC) threads 137 may perform automated memory management (such as freeing up memory that is no longer referenced by other threads) based on some set of GC algorithms in use at the executing process 150. One or more low-impact monitoring threads 138 may be responsible for collecting or obtaining performance and/or other metrics pertaining to the executing process 150 in the depicted embodiment. The output of the monitoring threads 138 may comprise a growing collection of values of various metrics over time. The metrics may logically be represented as a respective time series 160 for each type of metric collected, as indicated by arrow 121. Example metrics time series may, for example, include various types of processor usage values 162, memory usage values 164, thread count time values 166, and/or other time series for other metrics. In at least some embodiments, raw metric values may be processed to obtain derived metrics that may be more useful for analysis purposes, e.g., either by the monitoring threads 138 or by another entity such as the memory leak detector 180 discussed below. For example, using various raw metrics for processor usage values, it may be possible to determine or estimate the effective processor usage values associated with application threads 130 (as opposed to, say, management threads 135), and such effective processor usage derived metrics may be used in some of the statistical analysis described below. It is noted that not all the metric values may be determined for exactly the same point in time in at least some implementations—e.g., thread count values may be sampled once every 15 seconds, while processor utilization values may be obtained once every 5 seconds. The metrics collection intervals (as well as the set of metrics collected) may be tunable in at least some implementations. The output produced by the monitoring threads 138 may be made accessible by analysis tools such as leak detector 180 using any appropriate buffering, file input/output (I/O) and/or network transfer techniques in various embodiments.

As indicated by arrow 122, the metrics collections obtained for the executing process 150 may be used as input by leak detector 180 in the depicted embodiment. The leak detector may be configured to subdivide the metrics into observation periods in some embodiments, and perform a sequence of analysis steps described below on each observation period, in an attempt to detect memory leaks (and/or other problems such as unexpected memory usage patterns that may not necessarily be leaks) as quickly as possible. In some implementations, the observation periods may overlap in part with each other. For example, in one embodiment in which the metrics are collected for 24 hours, H1 through H24, the leak detector 180 may begin by deciding to focus on two-hour observation periods at a time, with an overlap step of one hour. Thus, the metrics collected for H1 and H2 may first be examined to determine whether a memory leak was exhibited, followed by an analysis for H2 and H3, followed by an analysis for H3 and H4, and so on. In at least some embodiments the analysis steps may be performed in real time or in close to real time. As indicated by arrow 123, based on the multi-step analysis of the metrics time series 160, the leak detector 180 may generate alerts 182 when a problem or potential problem is identified. For example, an alert 182 may be provided to an administrator or to an application manager console indicating that a possible memory leak has been identified with a particular statistical confidence level.

Figure 4:
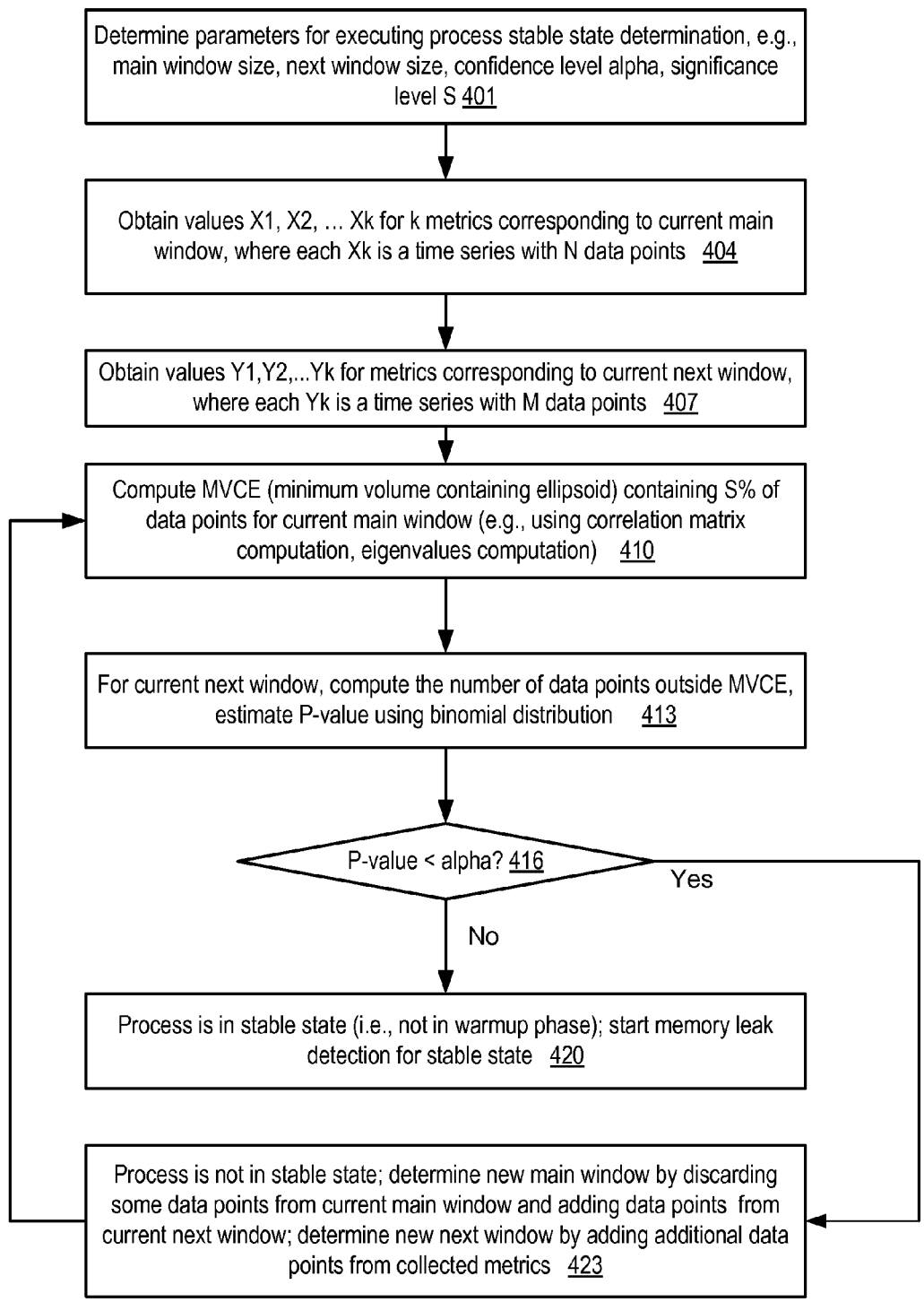
FIG. 4 is a flow diagram illustrating aspects of example operations that may be performed in some embodiments to determine whether an executing process has completed a warmup phase of operations, according to at least some embodiments.

In at least some embodiments, the metrics for a given observation period may be analyzed in several phases, such as the following set of phases, by the leak detector 180. In a preliminary phase in some implementations, if at least some metrics were collected very shortly after the process 150 was started, the leak detector 180 may identify and eliminate metrics corresponding to a warmup period of the process 150 from further analysis. Memory usage may increase for various valid reasons unrelated to memory leaks shortly after a process is launched or started (such as the loading of various executable classes, compilation tasks, opening of various logs and other files, starting up of initial numbers of threads etc.), and therefore memory leak analysis for warmup phases may typically not be particularly fruitful. An example of a statistical approach that may be used for this warmup elimination phase is illustrated in FIG. 4 and described in further detail below.

Figure 5:
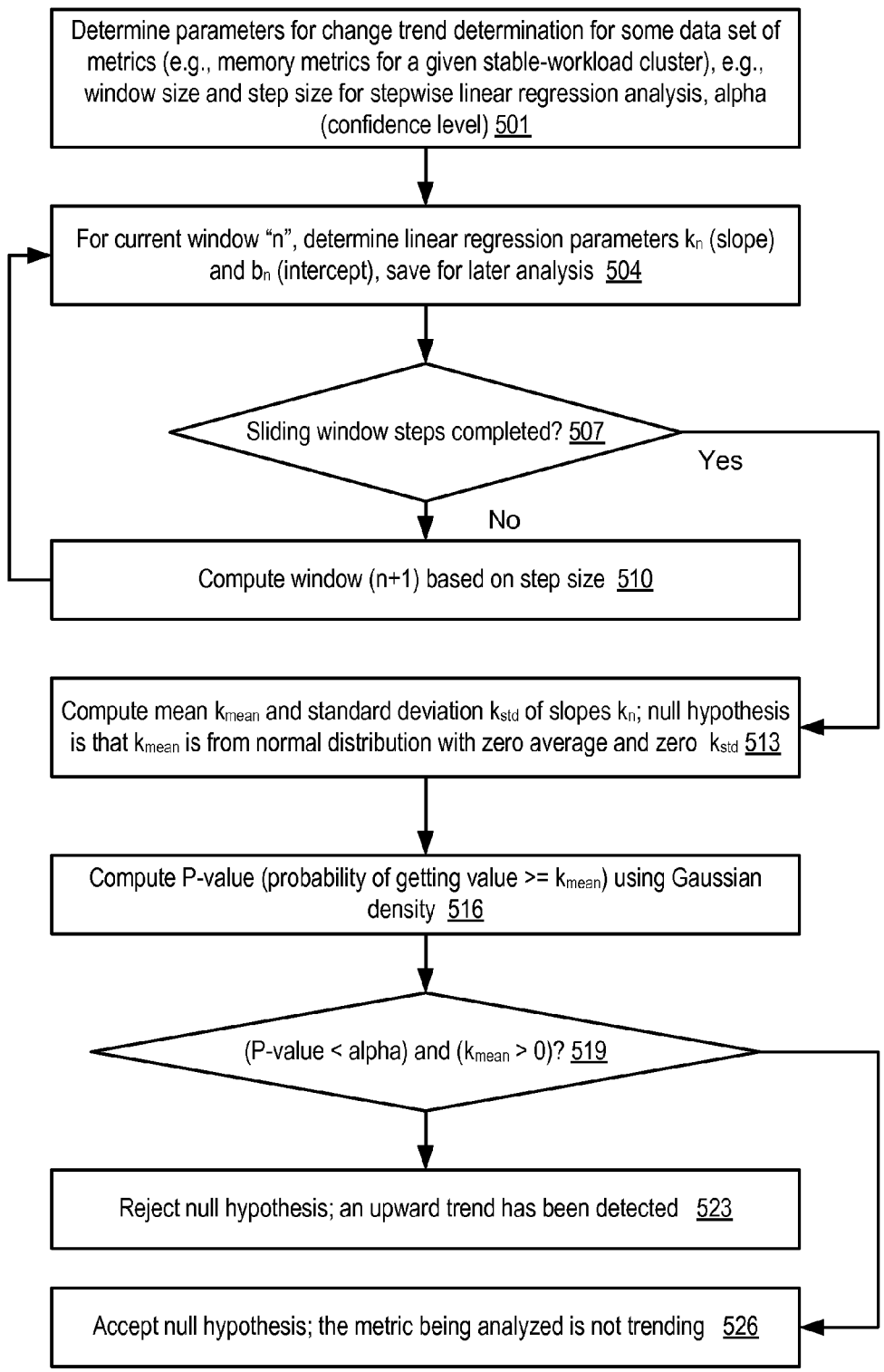
FIG. 5 is a flow diagram illustrating aspects of example operations that may be performed for trend analysis using stepwise linear regression, according to at least some embodiments.
Figure 7:
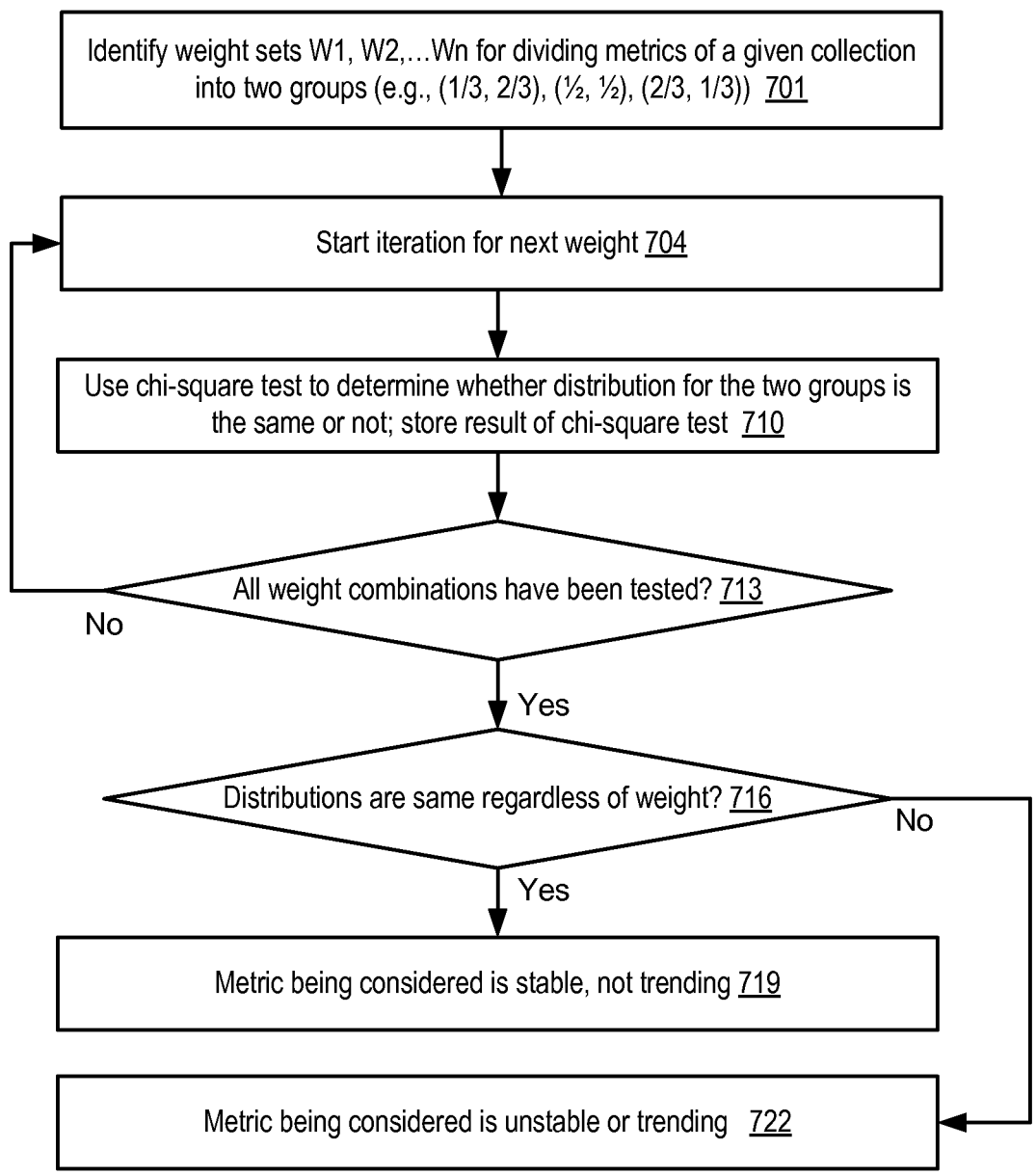
FIG. 7 is a flow diagram illustrating aspects of example operations using chi-square tests that may be performed for analyzing stability of a metric, according to at least some embodiments.

In one phase of statistical analysis (assuming the warmup metrics have been discarded), one or more time series of metrics that are expected to correlate strongly with workload level over the observation period may be analyzed for classification based on workload trends. Such metrics may include, for example, active application thread counts, total active thread counts (e.g., application threads as well as management threads), number of open networking sockets, and the like. The particular set of metrics that are most representative of workload may vary from one application to another in at least some embodiments, and the leak detector 180 may be configured to take such application differences into account during its analysis. In this phase, in some embodiments, trend analysis techniques such as various types of regression approaches may be used to identify sub-periods of the observation period during which the workload remained relatively stable, and other sub-periods during which the workload trended up or down. Examples of statistical approaches that may be useful for such analysis are shown in FIG. 5 and FIG. 7. During trending-workload sub-periods, the amount of memory used may largely be dependent on the workload changes, and as a result it may also be hard to identify memory leaks during such periods. Accordingly, after this phase of analysis, metrics corresponding to trending-workload sub-periods may be eliminated from the set of metrics to be analyzed further, and metrics corresponding to stable workload periods may be retained for further analysis.

Figure 6:
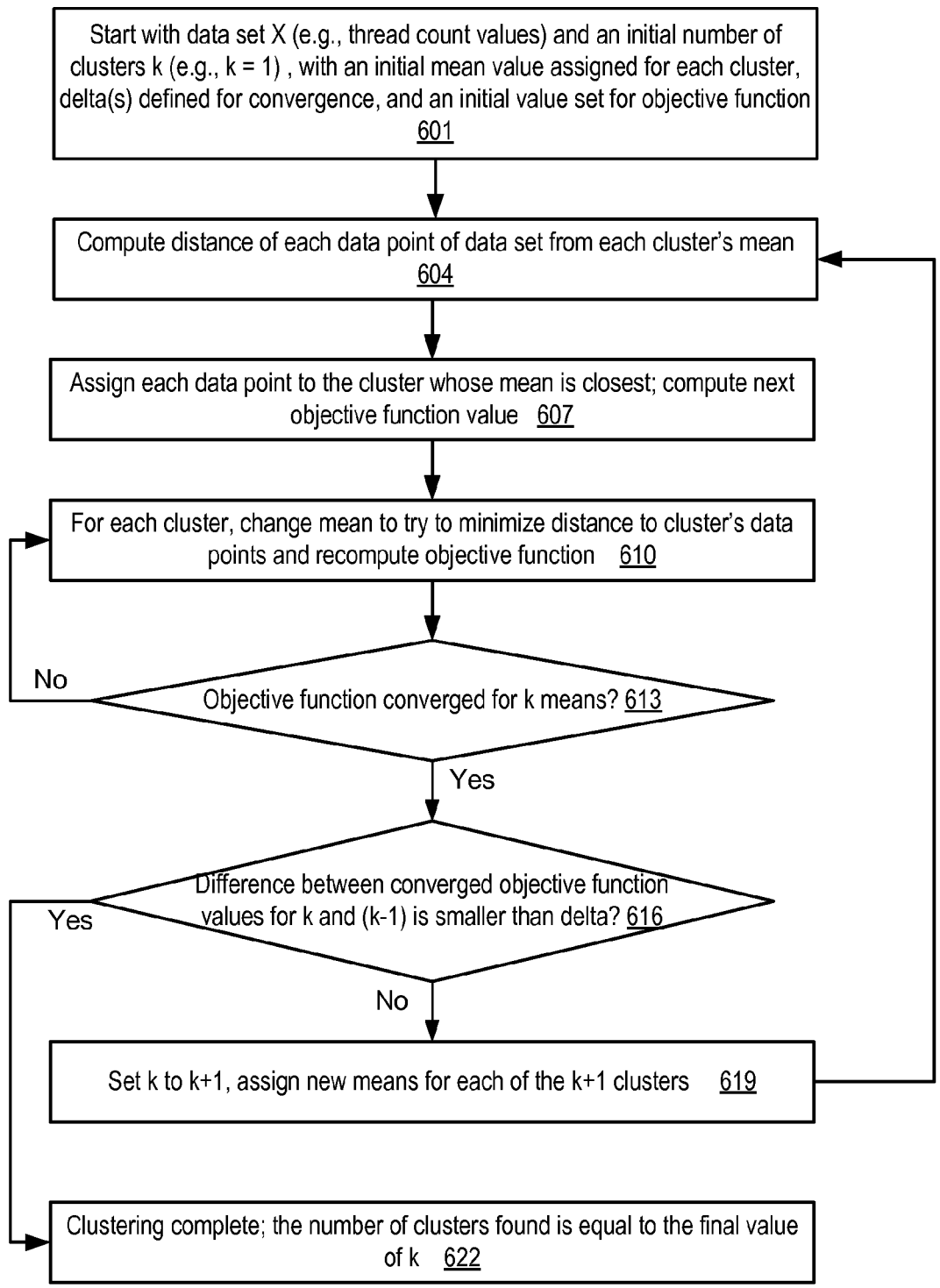
FIG. 6 is a flow diagram illustrating aspects of example operations that may be performed for cluster identification using k-means clustering, according to at least some embodiments.

In at least some embodiments, a cluster analysis phase (which may also be referred to as a statistical grouping phase) may then be started on the remaining metrics data, which corresponds to stable workloads. During this phase, the leak detector 180 may use any appropriate statistical grouping or clustering algorithms, such as k-means clustering, to identify metric clusters (including memory metric clusters derived from memory usage time series 164) that correspond to respective workload levels. For example, the leak detector may identify three clusters corresponding to mean workload levels of 5 requests per second, 20 requests per second, and 50 requests per second (with some variation around the mean) respectively. An example of a clustering approach using k-means clustering is illustrated in FIG. 6.

Finally, memory metrics corresponding to each cluster may be analyzed in at least some embodiments, e.g., to determine whether the memory use increased even as the workload did not. Since all the memory use values corresponding to a given cluster are for (approximately) stable workloads, an upward trend in memory usage (or a downward trend in free memory values) may indicate a memory leak. If such a trend is detected, in at least some embodiments the leak detector may also determine a confidence level associated with the trend, indicating how likely it is that the trend is real rather than a result of random fluctuations. Once again, in at least some embodiments, any appropriate statistical approaches such as various types of linear regression techniques may be used in this phase. As noted earlier, if a potential memory leak is found, a corresponding alert may be generated, which may lead to diagnosis and/or debugging.

In at least some implementations, the leak detector 180 may be implemented to improve itself over time. For example, using various machine learning or other artificial intelligence (AI) techniques, it may learn to identify the best representative metrics of workload for different applications over time. In some embodiments, the leak detector may try out several different statistical approaches for a given phase of analysis, and (based for example on measurements of the CPU or memory consumed for the analysis phase, and the number of actual leaks detected versus the number of false positives) may learn to identify the most effective and/or or most efficient statistical algorithms.

Figure 2:
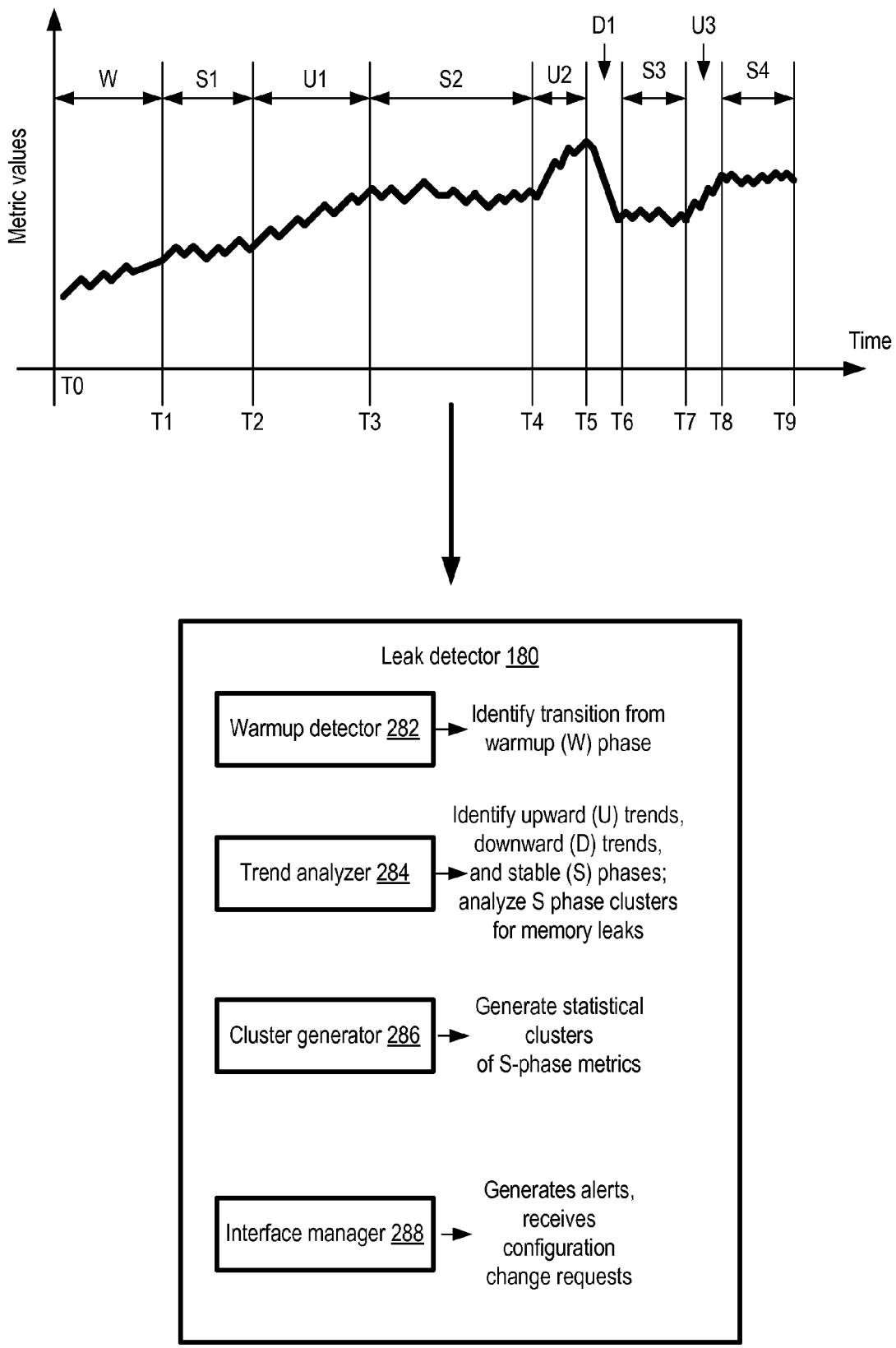
FIG. 2 illustrates an example variation over time of a metric indicative of workload levels, and components of a leak detector that may be used to analyze the metrics to detect possible memory leaks, according to at least some embodiments.

FIG. 2 illustrates an example variation over time of a metric indicative of workload levels, and subcomponents of a leak detector 180 that may be used to analyze the metrics to detect possible memory leaks, according to at least some embodiments. The X-axis of the graph represents time (staring from T0, when the process is started up), and the Y-axis represents the value of the metric for a particular executing process 150. Any appropriate metric, such as the number of active threads, may be used as a representative of workload in various implementations. The metric values collected over the time between T0 and T9 may be statistically divided (e.g., by the subcomponents of the leak detector 180) into a set of sub-periods (W, S1, U1, S2, U2, D1, S3, U3 and S4) based on the nature of the variations observed. In FIG. 2, the notation W represents warmup, the notation Sk represents the $k^{th}$ stable-workload sub-period, the notation Uk represents the $k^{th}$ upward-trending-workload sub-period, and the notation Dk represents the $k^{th}$ downward-trending-workload sub-period.

For example, in the depicted embodiment, a warmup detector 282 component of the leak detector 180 may identify the end of the warmup phase W of the executing process (e.g., in the example shown, a transition from sub-period W to sub-period S1). The warmup detector 822 may, for example use an MVCE (Minimum Volume Covering Ellipsoid) algorithm (of which an example is illustrated in FIG. 4) on values of multiple metric types to determine when the process enters a stable state after startup. It is noted that while the process 150 enters a stable state (i.e., it completes its warmup phase) at time T1 in the example shown, and the process remains in stable state thereafter, the workload directed to the process does not remain stable after T1—that is, while the stability of the process is demarcated by a transition detected at the end of a warmup phase, the workload varies independently (e.g., based on client demand for the service being provided by the process 150).

A trend analyzer 284 of the leak detector 180 may be responsible in the illustrated embodiment for distinguishing between the Sk (stable), Uk (upward-trending) and Dk (downward-trending) workload sub-periods, i.e., for classifying the collected metrics based on workload trends. In at least some embodiments, the trend analyzer 284 may also be responsible for detecting memory-usage trends in a later analysis for the clusters identified by cluster generator 286. Any of various statistical algorithms may be used for trend analysis in different embodiments, including for example stepwise linear regression, chi-square tests, and the like. After the trending sub-periods U1, U2, U3 and D1 are identified, metrics for the trending sub-periods may be discarded, while the metrics for the stable workload sub-periods S1, S2, S3 and S4 may be analyzed further.

Cluster generator 286 of the leak detector may take as input the workload metrics corresponding to S1, S2, S3 and S4 in the depicted embodiment. Any appropriate statistical grouping or clustering technique, such as k-means clustering (an example of which is illustrated in FIG. 6), may be used to identify some set of mean workload levels into which the observations for the Sk sub-periods can be grouped. In the k-means clustering technique, for example, the initial value of k may be set to 1 (i.e., a single cluster may be assumed), and the value of k may be incremented in each step until an objective function converges (i.e., stops changing within a specified delta value). For example, consider a particular iteration of the clustering analysis, in which the current set of clusters is C1, C2, . . . , Ck, for a given set of metric values X1, . . . , Xn, (such as active thread counts). In such a scenario, let Uij be the coefficients defining the cluster structure, such that Uij=1 if Xi is in cluster Cj, and Uij=0 otherwise. Then the objective function may be represented as $F(X) = \sum_{j=1}^{k}\sum_{i=1}^{n} Uij * (X_i - \Theta_j)^2$, where $\Theta_j$ is the mean value of cluster Cj.

In the illustrated example, at least one mean workload level may be identified for each of S1, S2, S3 and S4. Generally speaking, a given stable-workload sub-period may correspond to more than one mean workload level, depending on the parameters (such as the objective function) that is used for the clustering analysis. At least some of these mean workload levels may be the same—i.e., the mean workload levels identified for different sub-periods may not necessarily differ. After the clusters have been identified, as mentioned above, an analysis of the memory use metrics for each cluster may be performed in the depicted embodiment (e.g., with the help of trend analyzer 284). If memory use increases are detected even for approximately the same workload over different points in time, a memory leak may be identified.

The interface manager 288 may be responsible for generating notifications or alerts when a memory leak or any other problem is identified in the depicted embodiment. Any of a number of programmatic interfaces (such as a web page or web site, a standalone graphical user interface (GUI) or an application programming interface or API) may be used to transmit the alert or notification in various embodiments. In addition, the interface manager 288 may enable users or administrators to configure various properties of the leak detector 180, such as the specific algorithms to be used, values of various parameters of the algorithms, alert/notification techniques or targets, and the like. In some embodiments feedback regarding the success (or failure) of the leak detector may be provided via a programmatic interface, and such feedback may be used to improve the leak detector over time.

Figure 3:
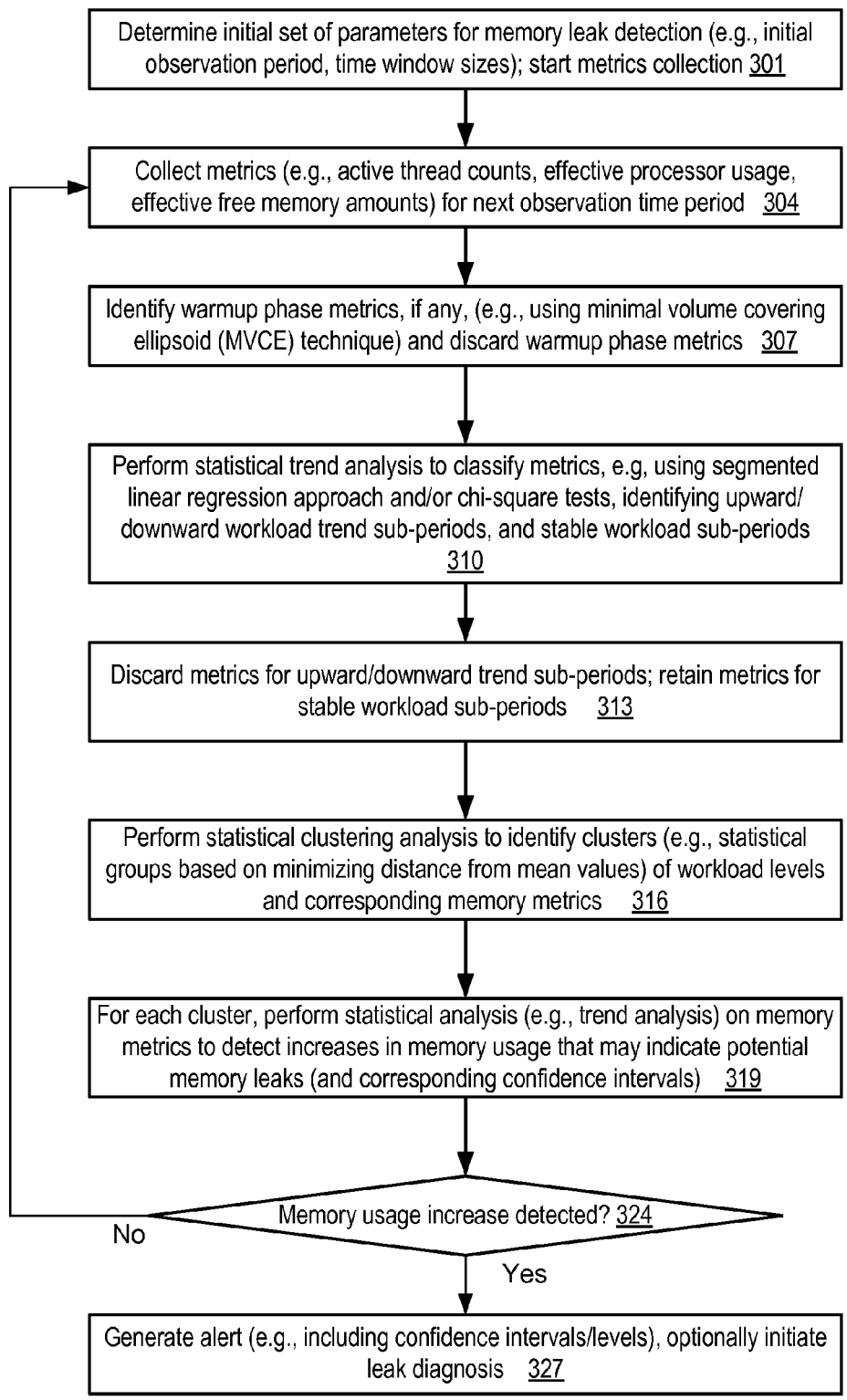
FIG. 3 is a flow diagram illustrating aspects of operations that may collectively be performed to detect memory leaks under varying workload conditions, according to at least some embodiments.

FIG. 3 is a flow diagram illustrating aspects of operations that may collectively be performed to detect memory leaks under varying workload conditions, according to at least some embodiments. As shown in element 301, an initial set of parameters for memory leak detection (such as observation period sizes, time window sizes for various algorithms and/or the specific algorithms themselves, the types of metrics to be collected and the frequencies of metric collection) may be determined, e.g., via system defaults or parameter files. Metric collection may be initiated for some set of metrics, including for example one or more workload-representing metrics and one or more memory metrics. In some embodiments, a low-overhead metrics collector thread (or several such threads) of the target executing process 150 may be used, while in other embodiments one or more other entities external to the process (such as a kernel-mode daemon or daemons) may be responsible for metric collection. After the initialization, the metrics collection and leak detection processing may continue in a loop starting with operations represented in element 304 of FIG. 3.

As shown in element 304, a number of metrics may be collected (or computed, in the case of derived metrics) over the next observation period, such as effective processor usage, effective memory usage, and the number of active threads. The effective processor usage at a JVM may be computed or approximated, for example, by subtracting, from the total processor usage associated with the process, the processor usage incurred by GC threads 137. Thus, the effective processor utilization may be derived from two other utilization metrics: processor usage for the process as a whole, and processor usage exclusively attributed to garbage collection. Effective memory usage in a JVM for a given measurement interval may be computed, for example, by summing up the amount of memory freed or recovered by GC threads 137 during the interval; thus, the raw metrics of memory freed by the GC threads can be used to obtain the effective memory usage derived metric. As noted earlier, different metrics may be collected at different intervals in some embodiments; thus, not all the metrics being collected have to be obtained at the same rate.

If the observation period involves a process startup or encompasses a period shortly after startup, in at least some embodiments a warmup phase detector 282 may identify those metrics that correspond to a warmup period during which the process was initializing various objects (element 307). Since memory usage may often increase dramatically during startup for legitimate reasons, data from warmup phases may typically not be useful in detecting memory leaks, and so this portion of the data may be ignored or discarded with respect to further analysis.

The leak detector may then perform statistical trend analysis in the depicted embodiment on the retained workload-representing metrics (element 310), to identify upward-trending-workload sub-periods, downward-trending-workload periods, and non-trending or stable-workload periods. Any appropriate statistical technique or combination of statistical techniques, such as segmented linear regression using sliding windows, and/or chi-square tests, may be used for the classification via trend analysis.

Since changing workloads would typically result in changing memory needs, it may not be fruitful to try to detect memory leaks during periods when the workload is trending. The metrics corresponding to the trending-workload sub-periods may be discarded in the depicted embodiment, while metrics for stable-workload periods may be retained (element 313). A clustering analysis may then be performed on the workload metrics of the stable-workload sub-periods (element 316), e.g., using k-means clustering or any other clustering or grouping algorithm. A set of workload clusters may thus be identified, with each cluster having a respective mean workload and some, typically small, variation around the mean. For each cluster of workload values, a corresponding set of memory usage metric values may be identified.

The memory metrics for each cluster may then be analyzed, e.g., using trend analysis, to determine whether memory use increases can be detected for a given workload level (element 319). In addition, confidence intervals may be determined for any increases in memory use that are detected. If an increase in memory use is detected (as determined in element 324) for a given workload level, an alert or similar notification indicative of a potential memory leak may be generated (element 327), and in some implementations a leak diagnosis may optionally be initiated. In at least some embodiments, the alert or notification may indicate the confidence intervals or confidence levels corresponding to each workload level for which an increase in memory usage was detected. If no evidence of a leak was found (e.g., if the memory use remained relatively constant as long as the workload remained the same) for each of the clusters, the operations corresponding to elements 304 onwards may be repeated for the next observation period. The operations illustrated in FIG. 3 may be performed for an executing process in a production environment in at least some embodiments, and may be repeated for the duration of the process lifetime. In some embodiments, administrators may be allowed to disable or reconfigure various aspects of the memory leak detection, such as the metrics collection, or the statistical analysis phases.

FIG. 4 is a flow diagram illustrating aspects of example operations that may be performed in some embodiments to determine whether an executing process has completed a warmup phase of operations, according to at least some embodiments. For example, a warmup detector 282 may employ the technique illustrated in FIG. 4 to determine whether a set of metrics for a given JVM were collected before the JVM completed its warmup and reached a stable state. More generally, the approach illustrated in FIG. 4 may be used in any environment in which a transition to a stable state after a rapidly-changing state (similar to process warmup) is to be detected. As shown in element 401, parameters for the statistical detection of a stable state for a process 150 may be identified. The parameters may include, for example, the boundaries of a main window (e.g., a time window for which metrics time series have been collected, and which is assumed to represent a stable state) and a next window following the main window. The parameters may also include a desired confidence level alpha in the results of the analysis, and a significance level S (indicating the percentage of metrics data points that should be covered by an ellipsoid) in at least some embodiments.

A set of k different metrics may be chosen for the analysis (e.g., effective processor usage, effective memory usage, active thread count, etc.), and time series of metrics values may be collected for each metric for the main window (element 404) and the next window (element 407). For example, for the main window, values X1, X2, . . . Xk may be collected, where each X is a time series with N data points for a given metric, and for the next window, values Y1, Y2, . . . , Yk may be collected, where each Y is a time series with M data points for the corresponding metric. Next, a minimum volume containing ellipsoid (MVCE) that encompasses S % of the data points of the main window may be computed (element 410). This computation may, for example, include the computation of a [k×k] correlation matrix for the metrics, and the computation of the corresponding eigenvalues.

Having computed the MVCE, the fraction of data points of the next window that lie outside the ellipsoid may then be computed, and the corresponding P-value (the probability of obtaining a fraction at least as high) may be computed assuming a binomial distribution with (1−P) as the probability of success in one trial) (element 413). If the P-value is no less than alpha (the confidence interval parameter), as detected in element 416, this may indicate that the process is indeed in stable state e.g., that the warmup phase is over given the current main window and next window. Thus, for example, the stable state period for the process may be assumed to have started at the end of the main window, or at least at the end of the next window.

If the P-value is less than alpha, as also detected in element 416, the process whose metrics are being analyzed may be deemed to still not be in a stable state (e.g., it may be deemed to be in a warmup state) (element 419). Accordingly, a new main window may be determined, e.g., by removing some number of older data points from the main window and adding some newer data points. Similar, a new next window may also be computed, e.g., by including some number of data points for later-collected metrics. The ellipsoid-based analysis may be repeated, until eventually the transition to a stable state is identified. It is noted that the approach illustrated in FIG. 4 represents one example statistical technique that may be used to determine when a process reaches a stable state; other approaches may be used in various embodiments.

FIG. 5 is a flow diagram illustrating aspects of example operations that may be performed for trend analysis using stepwise linear regression, according to at least some embodiments. The technique may be applied, for example, to a data set of effective memory usage metrics corresponding to a stable-workload cluster in some embodiments. As shown in element 501, parameters for statistical change trend determination may be obtained, such as a window size and a step size for stepwise linear regression, as well as alpha, a measure of confidence level. Operations illustrated in elements 504, 507 and 510 may be repeated until all the data points being examined are exhausted. As shown in element 504, linear regression parameters $k_n$ (representing the slope of a metric's value) and $b_n$ (representing the intercept) may be determined for the nth window during the nth iteration of the loop, and saved for later analysis. If all the sliding windows of the data points have been examined (as detected in element 507), the loop may be exited; otherwise the (n+1)st window may be identified and the corresponding slope and intercept may be calculated and saved.

After all the slope values and intercept values have been determined, the mean $k_{mean}$ and standard deviation $k_{std}$ of the values may be determined (element 513). The null hypothesis for the analysis may be as follows: $k_{mean}$ is from a normal distribution with zero average and zero standard deviation. A P-value (probability of getting a value greater than or equal to $k_{mean}$) using Gaussian density may then be computed (element 516). If the P-value is less than alpha, and $k_{mean}$ is greater than zero, as detected in element 519, the null hypothesis may be rejected and the metric being analyzed may be deemed to have an upward trend (element 523). Otherwise, the null hypothesis may be assumed to be valid, and the metric being analyzed may be deemed to be non-trending or stable (element 526). An analogous approach may be used to detect downward-trending metrics (in which case $k_{mean}$ may be negative) in at least some embodiments. It is noted that the stepwise linear regression approach outlined in FIG. 5 represents one example of statistical algorithm for trend detection, and that any appropriate algorithm may be used for trend detection in various embodiments. In some embodiments, the linear regression approach outlines in FIG. 5 may be used.

FIG. 6 is a flow diagram illustrating aspects of example operations that may be performed for grouping or cluster identification using k-means clustering, according to at least some embodiments. Such operations may be used to identify clusters representing stable workload levels during memory leak analysis in at least some embodiments, e.g., as part of the processing illustrated in element 316 of FIG. 3. Other clustering approaches may be used in other embodiments. At a high level, the technique illustrated in FIG. 6 consists of the following steps: (a) start with some assumed number k of clusters with respective mean values for each cluster; (b) determine the converged value of an objective function for that number of clusters (i.e., adjust the means until the objective function doesn't change significantly as a result of the change); (c) increment k, and determine the converged value of the objective function for the new value of k; if the converged value of the objective function for this new value of k is not significantly different from that for the previous value of k, the clustering is complete, else continue with the next incremented value of k. The objective function is typically based on the distances of the individual data points from the mean of the cluster to which the data point is assigned. For example, consider a particular iteration of the clustering analysis, in which the current set of clusters is C1, C2, ..., Ck, for a given set of metric values X1, ..., Xn, (such as active thread counts). In such a scenario, let Uij be the coefficients defining the cluster structure, such that Uij=1 if Xi is in cluster Cj, and Uij=0 otherwise. Then the objective function to be minimized may be represented as $F(X)=\Sigma_{j=1}^{k}\Sigma_{i=1}^{n}Uij*(X_i-\Theta_j)^2$, where $\Theta_j$ is the mean value of cluster Cj.

As shown in element 601 of FIG. 6, in the depicted embodiment the clustering analysis may start with a data set X with N values (such as all the values for active thread counts corresponding to the stable-workload sub-periods of the observation period), some initial value for k (such as 1) with respective initial mean values for each of the k clusters, delta values defined for convergence decisions (e.g., for convergence within a single iteration with a given k, and for convergence of the objective function across iterations with two different k values). The distance (e.g., the numerical difference in the number of active threads) of each data point in data set X from the means of each cluster may then be computed (element 604). Each data point may then be assigned to the cluster whose current mean is nearest (element 607), and the objective function calculated. Then, an attempt may be made to reduce the objective function value, by moving or changing the means of the clusters (so that the distances to the data points is reduced if possible) (element 610), and the objective function may be recomputed. If the changes to the means do not have a significant impact on the objective function, i.e., the difference between the objective functions is less than some delta (as detected in element 613), the objective function is said to have converged for the current value of k. If the changes to the means do not result in convergence, the operations corresponding to elements 610 may be repeated, until convergence is achieved.

After the converged value of the objective function has been determined for a given value of k, the difference between the objective function value obtained for k and (k–1) may be computed, and if these two objective function values differ by less than some delta (as detected in element 616), the clustering analysis is deemed to have been completed (element 622). If the objective function values for k and (k–1) have not converged, k may be incremented (element 619), a new set of means may be assigned for the new set of clusters, and the operations corresponding to elements 604 onwards may be repeated. In at least some embodiments, the clustering analysis may be terminated at any stage if the total time taken (or the total processing power consumed) has exceeded some threshold; such an approach may ensure that resources used for the analysis do not grow in an unbounded fashion.

FIG. 7 is a flow diagram illustrating aspects of example operations using chi-square tests that may be performed for analyzing stability (e.g., the absence of trending) of a metric, according to at least some embodiments. The technique may also be applied, for example, to a data set of memory usage metrics corresponding to a stable-workload cluster in some embodiments. As shown in element 701, given a set of metrics, a set of weights W1, W2 ... Wn may be chosen, to divide the metrics into two groups. For example, given the weight (⅓, ⅔), 33% of the metrics may be placed in the first group, and 67% in the second. For weight (½, ½), 50% of the metrics may be placed in the first group, and 50% in the second group. The two groups of metrics corresponding to each weight setting may then be examined in turn. An analysis iteration for the next weight being considered may be started (element 704). A chi-square test may be run for the two groups corresponding to the weight, to determine whether the distribution of the metric is the same in the two groups or not (element 710). The result of the chi-square test may be stored for later use. If chi-square tests have been run for all the weights (as determined in element 713), the saved results for all the weights may be analyzed. If all the tests for all the weights indicate the same distribution, regardless of the particular weight that was used, the metric is deemed stable (element 719); otherwise, if at least some of the distributions differ, the metric is deemed not stable or trending (element 722) in the depicted embodiment.

Figure 8:
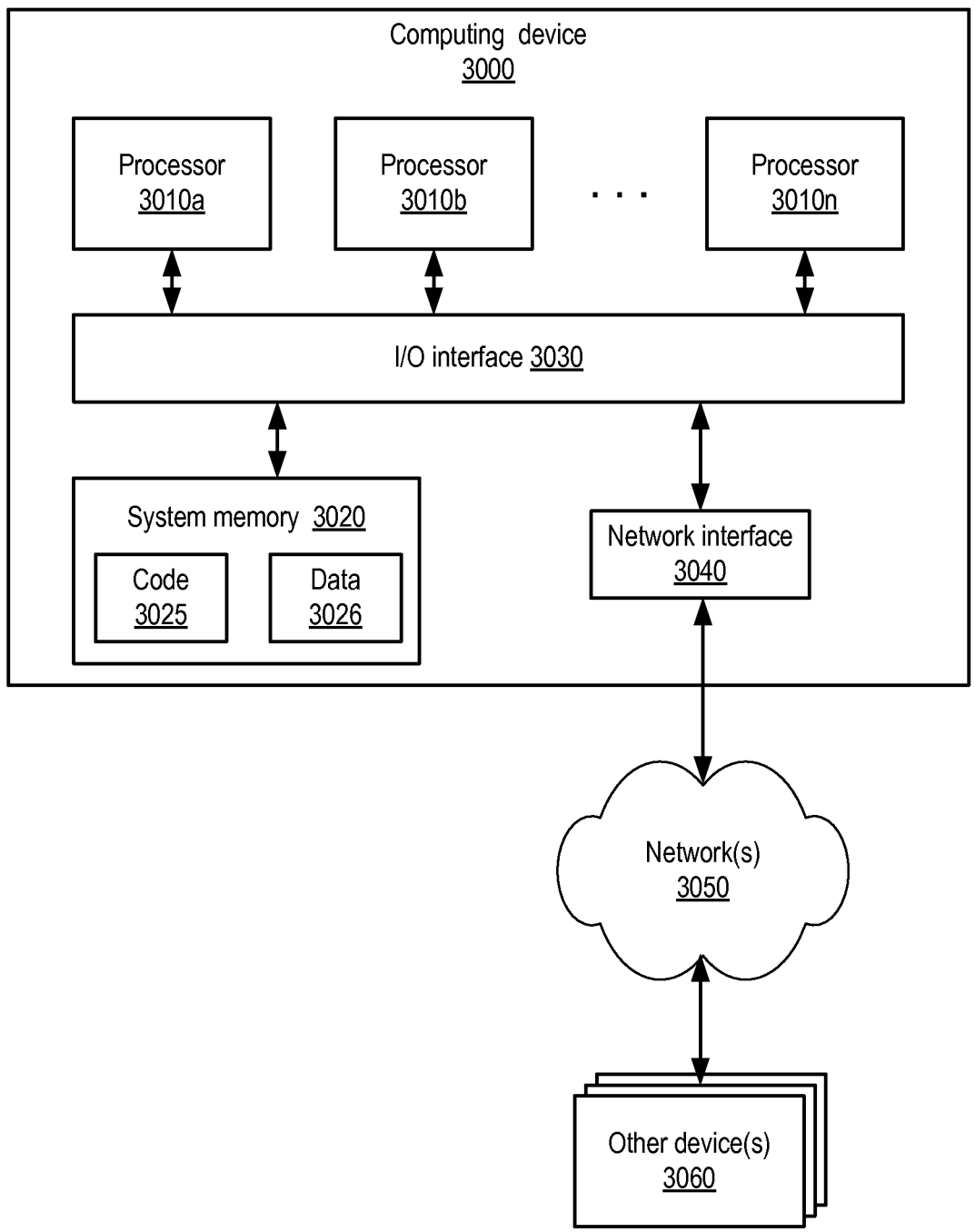
FIG. 8 is a block diagram illustrating an example computing device that may be used in at least some embodiments.

In at least some embodiments, a server that implements a portion or all of one or more of the technologies described herein, including the techniques to implement the leak detector 180, the executing process 150 with the monitoring threads 138, or other monitoring and statistical analysis components, may include a general-purpose computer system that includes or is configured to access one or more computer-accessible media. FIG. 8 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 7, including various devices serving as clients, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a transitory computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by one or more computing devices:
classifying, based at least in part on a first statistical analysis, one or more performance metric collections corresponding to an observation period of an executing process into a first set of metrics representing one or more sub-periods during which a workload of the executing process exhibited a change trend, and a second set of metrics representing one or more sub-periods during which the workload did not exhibit a change trend;
grouping, based at least in part on a second statistical analysis, the second set of metrics into one or more metric clusters, wherein each metric cluster of the one or more metric clusters represents a respective statistically stable workload level;
detecting, based at least in part on a third statistical analysis of a particular performance metric corresponding to the one or more metric clusters, whether an upward trend in memory usage at the executing process during the observation time period is indicated; and
in response to detecting that an upward trend in memory usage at the executing process during the observation time period is indicated, providing a notification of a potential memory leak at the executing process, wherein said notification of the potential memory leak comprises an indication of a confidence level associated with the upward trend in memory usage.

2. The method as recited in claim 1, wherein a particular performance metric collection of the one or more performance metric collections comprises a time series of at least one of (a) a processor utilization metric, (b) a free-memory metric, (c) an active thread count metric.

3. The method as recited in claim 1, wherein the first statistical analysis comprises (a) dividing the observation period into a plurality of time windows, and (b) analyzing, using linear regression, respective metric values corresponding to each time window of the plurality of time windows.

4. The method as recited in claim 1, wherein the second statistical analysis comprises a k-means clustering analysis.

5. The method as recited in claim 1, wherein the particular performance metric comprises an indication of an amount of free heap memory measured after a garbage collection cycle, and wherein the third statistical analysis comprises a determination of whether, for a particular metric cluster, the free heap memory decreases over a time period.

6. The method as recited in claim 1, wherein the one or more performance metric collections correspond to metrics of one or more application threads of the executing process, and are obtained by a monitoring thread of the executing process in a production environment.

7. The method as recited in claim 1, wherein the executing process comprises a virtual machine of a platform-independent execution environment.

8. A system, comprising:
one or more hardware computing devices configured to:
classify, based at least in part on a first statistical analysis, one or more performance metric collections corresponding to an observation period of an executing process into a first set of metrics representing one or more sub-periods during which a workload of the executing process exhibited a change trend, and a second set of metrics representing one or more sub-periods during which the workload did not exhibit a change trend;
group, based at least in part on a second statistical analysis, the second set of metrics into one or more metric clusters, wherein each metric cluster of the one or more metric clusters represents a respective statistically stable workload level, and wherein the second statistical analysis comprises a k-means clustering analysis;
determine, based at least in part on a third statistical analysis of a particular performance metric corresponding to the one or more metric clusters, whether an upward trend in memory usage at the executing process during the observation time period is indicated; and
in response to a determination that an upward trend in memory usage is indicated, provide a notification of a potential memory leak at the executing process.

9. The system as recited in claim 8, wherein a particular performance metric collection of the one or more performance metric collections comprises a time series of at least one of (a) a processor utilization metric, (b) a free-memory metric, (c) an active thread count metric.

10. The system as recited in claim 8, wherein the first statistical analysis comprises (a) a division of the observation period into a plurality of time windows and (b) linear regression analysis of respective metric values corresponding to each time window of the plurality of time windows.

11. The system as recited in claim 8, wherein the particular performance metric comprises an indication of an amount of free heap memory measured after a garbage collection cycle, and wherein the third statistical analysis comprises a determination of whether, for a particular metric cluster, the free heap memory decreases over a time period corresponding to the metric cluster.

12. The system as recited in claim 8, wherein notification of the potential memory leak comprises an indication of a confidence level associated with the upward trend in memory usage.

13. A non-transitory computer-accessible storage medium storing program instructions that when executed on one or more processors:
classify, based at least in part on a first statistical analysis, one or more performance metric collections corresponding to an observation period of an executing process into a first set of metrics representing one or more sub-periods during which a workload of the executing process exhibited a change trend, and a second set of metrics representing one or more sub-periods during which the workload did not exhibit a change trend;
determine, based at least in part on a second statistical analysis of the second set of metrics, one or more metric clusters, wherein each metric cluster of the one or more metric clusters represents a respective statistically stable workload level;
detect, based at least in part on a third statistical analysis of a particular performance metric corresponding to the one or more metric clusters, whether an upward trend in memory usage at the executing process during the observation time period is indicated, wherein the particular performance metric comprises an indication of an amount of free heap memory measured after a garbage collection cycle, and wherein the third statistical analysis comprises a determination of whether, for a particular metric cluster, the free heap memory decreases over a time period corresponding to the metric cluster; and in response to a detection that an upward trend in memory usage at the executing process during the observation time period is indicated, provide a notification of a potential memory leak at the executing process.

14. The non-transitory computer-accessible storage medium as recited in claim 13, wherein a particular performance metric collection of the one or more performance metric collections comprises a time series of at least one of (a) a processor utilization metric, (b) a free-memory metric, (c) an active thread count metric.

15. The non-transitory computer-accessible storage medium as recited in claim 13, wherein the first statistical analysis comprises (a) a division of the observation period into a plurality of time windows and (b) linear regression analysis of respective metric values corresponding to each time window of the plurality of time windows.

16. The non-transitory computer-accessible storage medium as recited in claim 13, wherein the second statistical analysis comprises a k-means clustering analysis.

17. The non-transitory computer-accessible storage medium as recited in claim 13, wherein notification of the potential memory leak comprises an indication of a confidence level associated with the upward trend in memory usage.

18. A method, comprising:
performing, by one or more computing devices:
collecting a set of metrics of an executing process over an observation period;
identifying, using at least a particular metric of the set, one or more sub-periods of the observation period corresponding to a statistically stable workload level;
determining, using at least a different metric of the set, whether memory usage at the executing process increased during the one or more sub-periods corresponding to the statistically stable workload level; and
in response to determining that the memory usage at the executing process increased during the one or more sub-periods, generating a notification of a potential memory leak at the executing process, wherein notification of the potential memory leak comprises an indication of a confidence level associated with the increased memory usage.

19. A non-transitory computer-accessible storage medium storing program instructions that when executed on one or more processors:
collect a set of metrics of an executing process over an observation period;
identify, using at least a particular metric of the set, one or more sub-periods of the observation period corresponding to a statistically stable workload level;
determine, using at least a different metric of the set, whether memory usage at the executing process increased during the one or more sub-periods corresponding to the statistically stable workload level; and
in response to a determination that the memory usage at the executing process increased during the one or more sub-periods, generate a notification of a potential memory leak at the executing process, wherein notification of the potential memory leak comprises an indication of a confidence level associated with the increased memory usage.

* * * * *